(12) United States Patent
Ung et al.

(10) Patent No.: US 7,190,600 B1
(45) Date of Patent: Mar. 13, 2007

(54) SINGLE OUTPUT EL DRIVER PRODUCING REDUCED CURRENT SPIKES

(75) Inventors: Kenneth Vi Ung, Chandler, AZ (US); Harold Gee Yee, Chandler, AZ (US); Robert Allen Kimball, Gilbert, AZ (US)

(73) Assignee: World Properties, Inc., Lincolnwood, IL (US)

( * ) Notice: Subject to any disclaimer, the term of this patent is extended or adjusted under 35 U.S.C. 154(b) by 330 days.

(21) Appl. No.: 11/007,699

(22) Filed: Dec. 8, 2004

(51) Int. Cl.
*H02M 7/537* (2006.01)

(52) U.S. Cl. ........................................ 363/131; 363/97
(58) Field of Classification Search ................ 363/40, 363/41, 97, 98, 131, 132, 133, 134, 135, 363/147; 315/194, 208, 209 R
See application file for complete search history.

(56) References Cited

U.S. PATENT DOCUMENTS

| | | | |
|---|---|---|---|
| 4,527,096 A | 7/1985 | Kindlmann | 315/169.3 |
| 5,313,141 A | 5/1994 | Kimball | 315/169.3 |
| 5,463,283 A | 10/1995 | Sanderson | 315/209 R |
| 5,668,703 A | 9/1997 | Rossi et al. | 363/16 |
| 5,789,870 A | 8/1998 | Remson | 315/194 |
| 5,854,539 A | 12/1998 | Pace et al. | 315/208 |
| 6,038,153 A * | 3/2000 | Andersson et al. | 363/97 |
| 6,259,619 B1 * | 7/2001 | Buell | 363/147 |

* cited by examiner

*Primary Examiner*—Jessica Han
(74) *Attorney, Agent, or Firm*—Paul F. Wille

(57) ABSTRACT

An inverter for supplying alternating current to an EL lamp includes a first charging path, a first discharging path, a second charging path, a second discharging path, the paths intersecting at a node, wherein the node is the output of the inverter from which the alternating current flows. The charging paths include inductive boost circuits having a common inductor.

9 Claims, 2 Drawing Sheets

SINGLE OUTPUT EL DRIVER PRODUCING REDUCED CURRENT SPIKES

BACKGROUND

This invention relates to inverters for electroluminescent (EL) lamps and, in particular, to an inverter producing lower amplitude current spikes through an EL lamp having one electrode grounded.

An EL lamp is essentially a capacitor having a dielectric layer including a phosphor powder and a dielectric layer between two conductive electrodes, one of which is transparent. Because the EL lamp is a capacitor, an alternating current (AC) must be applied to cause the phosphor to glow, otherwise the capacitor charges to the applied voltage and current through the EL lamp ceases. The phosphor particles radiate light in the presence of a strong electric field, using relatively little current. As used herein, an EL "panel" is a single sheet including one or more luminous areas, wherein each luminous area is an EL "lamp."

In portable electronic devices, automotive displays, and other applications where the power source is a low voltage battery, an EL lamp is powered by an inverter that converts direct current into alternating current. In order for an EL lamp to glow sufficiently, a peak-to-peak voltage in excess of about one hundred and twenty volts is necessary. The actual voltage depends on the construction of the lamp and, in particular, the field strength within the phosphor powder. The frequency of the alternating current through an EL lamp affects the life of the lamp, with frequencies between 200 hertz and 1000 hertz being preferred. Ionic migration occurs in the phosphor at frequencies below 200 hertz. Above 1000 hertz, the life of the phosphor is inversely proportional to frequency.

An inverter for EL lamps is typically what is known as a "flyback" inverter in which the energy stored in an inductor is supplied to the EL lamp as a small current at high voltage. If one considers a system as including a battery, an inductor, and an EL lamp, the prior art discloses switching one of these elements to obtain an alternating current through the lamp.

FIG. 1 is a schematic diagram based upon U.S. Pat. No. 4,527,096 (Kindlmann), in which the EL lamp is switched. When transistor 14 turns on, current flows through inductor 15, storing energy in the magnetic field generated by the inductor. When transistor 14 shuts off, the magnetic field collapses at a rate determined by the turn-off characteristics of transistor 14. The voltage across inductor 15 is proportional to the rate at which the field collapses. Thus, a low voltage and large current is converted into a high voltage at a small current.

The current pulses are coupled through diode 16 to the DC diagonal of a switching bridge having EL lamp 12 connected across the AC diagonal. The transistors in opposite legs of the bridge conduct alternately to reverse the connections to lamp 12. The bridge transistors switch at a lower frequency than transistor 14. The four bridge transistors are high voltage components, adding considerably to the size and cost of the circuit. The circuit is not single ended, i.e. one cannot ground one side of lamp 12. Inductor 15 discharges directly into lamp 12, producing current spikes. The bridge circuit disclosed in the Kindlemann patent is also sometimes referred to as an H-bridge output, where the switching transistors form the posts and the EL lamp forms the cross-bar of the H.

U.S. Pat. No. 5,436,283 (Sanderson) discloses a variation of the circuit shown in FIG. 1. The variation includes a storage capacitor connected across the DC diagonal of the bridge and a constant current source in each of the two upper legs of the bridge. This reduces current spikes but does not provide a single ended output. U.S. Pat. No. 5,686,797 (Sanderson) includes the same disclosure as the '283 patent.

FIG. 2 is a diagram taken from U.S. Pat. No. 5,313,141 (Kimball). U.S. Pat. No. 5,668,703 (Rossi et al.) discloses substantially the same circuit, in which the inductor is switched to obtain an alternating current. Inverter 20 is a three terminal device having supply terminal 21, ground terminal 22, and high voltage terminal 23. Within inverter 20, first switching circuit 25 pumps current pulses through inductor 26 and second switching circuit 27 connects current pulses from inductor 26 to EL lamp 12 through high voltage terminal 23.

Switching circuit 25 includes switches 31 and 32 forming a series circuit with inductor 26 between supply terminal 21 and ground terminal 22. Switching circuit 27 includes switches 33 and 34 connected between each end of inductor 26 and high voltage terminal 23. Specifically switch 33 is connected between end 37 of inductor 26 and high voltage terminal 23. Switch 34 is connected between end 38 of inductor 26 and high voltage terminal 23.

When switches 31 and 34 are closed (conducting) and switch 33 is open (non-conducting), switch 32 opens and closes at a high frequency, producing a series of high voltage pulses that are connected from terminal 38 of inductor 26 through switch 34 to high voltage terminal 23. When switch 32 opens, the field on inductor 26 collapses, attempting to maintain the current flowing in the same direction as before switch 32 opened. The only current path remaining is through switch 34 to lamp 12, charging the upper electrode of lamp 12 positively. Diode 35 blocks current from lamp 12 to ground when switch 32 is closed.

For the second half of the cycle, switch 32 closes and remains closed, switch 34 opens and remains opened, and switch 33 closes and remains closed. Switch 31 opens and closes at high frequency, producing a series of current pulses through inductor 26. During this half of the cycle, terminal 37 of inductor 36 is connected through switch 33 to lamp 12. When switch 31 opens, the collapsing field in inductor 26 tries to maintain the current flowing in the same direction as before switch 31 opened. Since terminal 37 is connected to lamp 12, this current is drawn from lamp 12, discharging the upper electrode of lamp 12 and eventually charging the upper electrode negatively. Diode 36 blocks current from lamp 12 to supply terminal 21 when switch 31 is closed. After a given number of high frequency pulses, the upper electrode of lamp 12 is at a peak negative voltage and the cycle ends.

FIG. 3 is a functional diagram of a circuit based upon U.S. Pat. No. 5,854,539 (Pace et al.), in which the battery is switched to obtain an alternating current. The circuit operates similarly to the circuit of FIG. 1, except that the battery connections are periodically reversed instead of the lamp connections. Inductor 41 dumps current directly into EL lamp 12, producing undesirable current spikes. Like the circuit shown in FIG. 1, one terminal of lamp 12 cannot be grounded.

An inverter having a single ended output has several advantages over inverters with bridge type outputs and is very much desired in the market. Unfortunately, the advantages come with a trade-off, viz. an inductor discharges directly into an EL lamp, producing a current spike that causes excessive power consumption, reduced efficiency, and difficulty driving some high impedance EL lamps having an area greater than approximately 15 $cm^2$. Specifically, some thin, screen printed EL lamps adapted for backlighting keypads exhibit high impedance. Other lamps do as well, depending upon materials and thicknesses. EL lamps have a nominal capacitance of 0.47 nf per square centimeter. Discharging an inductor directly into a capacitor greater than about 10 nf can cause significant current spikes. Semiconductor components used for implementing an inverter must withstand not only the high voltage from an inductor but the current spike as well. This increases the cost of implementing the inverter as an integrated circuit and restricts the technologies that can be used for making the inverter.

In view of the foregoing, it is therefore an object of the invention to provide an inverter having a single ended output and reduced current spikes.

Another object of the invention is to provide a single ended inverter that can be implemented in bipolar or CMOS technologies.

A further object of the invention is to improve the efficiency of an inverter having an single ended output.

SUMMARY OF THE INVENTION

The foregoing objects are achieved in the invention in which an inverter for supplying alternating current to an EL lamp includes a first charging path, a first discharging path, a second charging path, a second discharging path, the paths intersecting at a node, wherein the node is the output of the inverter from which the alternating current flows. The charging paths include inductive boost circuits having a common inductor.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
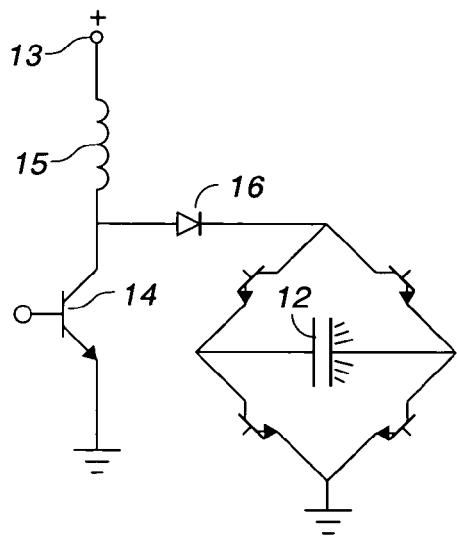
FIG. 1 is a schematic diagram of an inverter constructed in accordance with the prior art.
Figure 2:
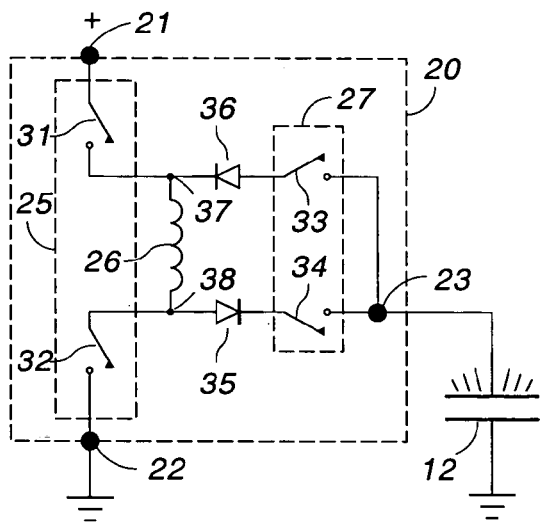
FIG. 2 is a schematic diagram of an inverter constructed in accordance with the prior art.
Figure 3:
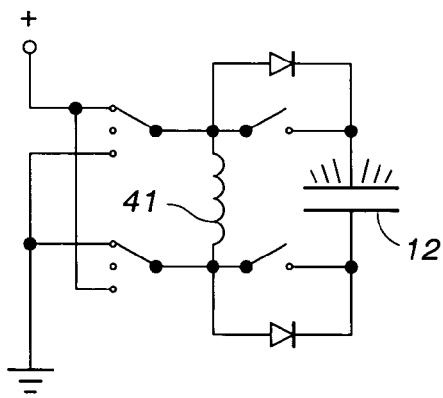
FIG. 3 is a schematic diagram of an inverter constructed in accordance with the prior art.
Figure 4:
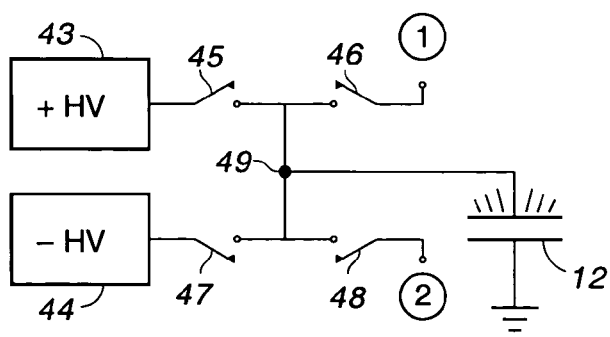
FIG. 4 is a block diagram of an inverter constructed in accordance with the invention.

FIG. 4 is a block diagram of an inverter constructed in accordance with the invention. EL lamp 12 is powered by an inverter including positive high voltage supply 43, negative high voltage supply 44, and switches 45, 46, 47, and 48. Switch 46 couples lamp 12 to reference 1. Switch 48 couples lamp 12 to reference 2. Reference 1 can be either low voltage supply or common and reference 2 can be either low voltage supply or common, independently of reference 1. Thus, FIG. 4 represents any one of four combinations of the circuit. The charging and discharging paths have common node 49, wherein the node is a single ended output terminal for the inverter.

Switch 45 closes to charge lamp 12 from supply 43 and switch 46 closes to discharge lamp 12. Switch 47 closes to charge lamp 12 from supply 44 and switch 48 closes to discharge lamp 12. No two switches are closed simultaneously. The operation of the switches is controlled by suitable logic, not shown. Using a bi-directional semiconductor switch for one of switches 46 and 48, the other of switches 46 and 48 can be eliminated. However, implementation is simpler if directional current paths are used. Thus, two discharge paths are shown for the preferred embodiment.

Supplies 43 and 44 can be any known circuit for inverting low voltage DC, e.g. 3–15 volts, to high voltage DC, e.g. 50–160 volts. Separate supplies provide some advantages but not including cost. In a preferred embodiment of the invention, the high voltage supplies share some components.

Figure 5:
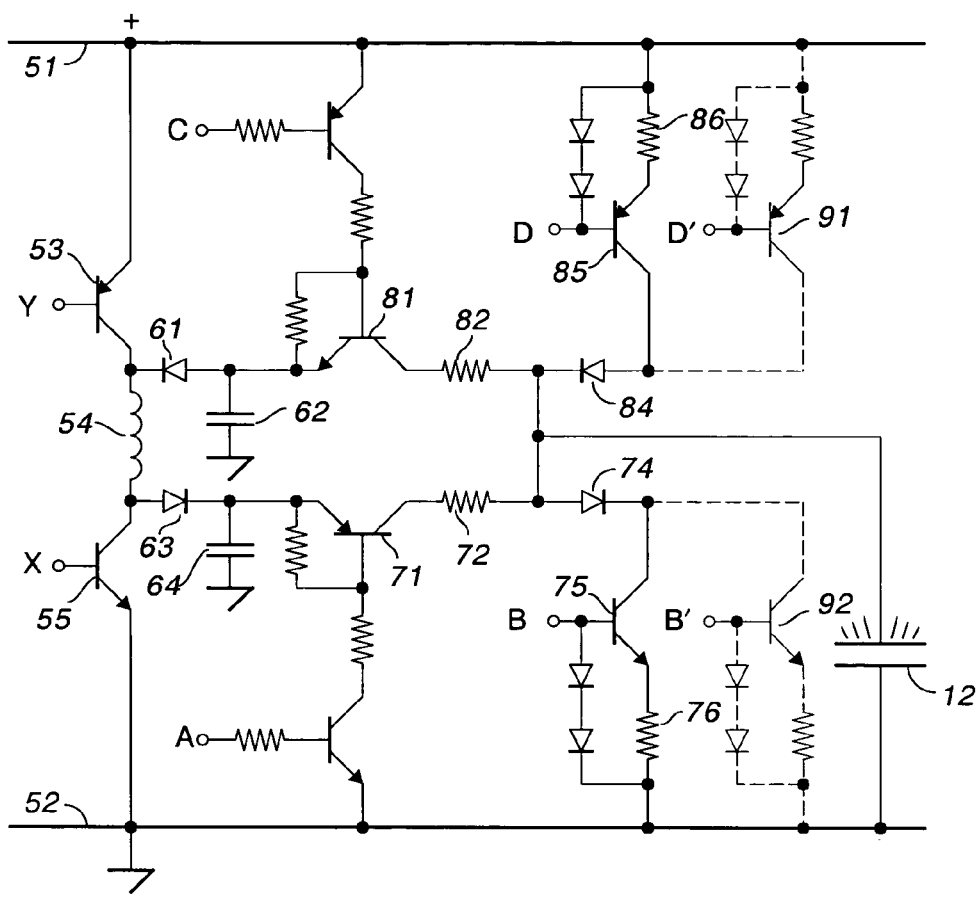
FIG. 5 is a schematic of an inverter constructed in accordance with a preferred embodiment of the invention.

FIG. 5 is a schematic of an inverter constructed in accordance with a preferred embodiment of the invention. Rail 51 is connected to a source of low voltage DC, such as a battery. Rail 52 is common. Transistor 53, inductor 54, and transistor 55 are coupled in series between rail 51 and rail 52. Diode 61 couples one end of inductor 54 to capacitor 61. Diode 63 couples the other end of inductor 54 to capacitor 64.

Figure 6:
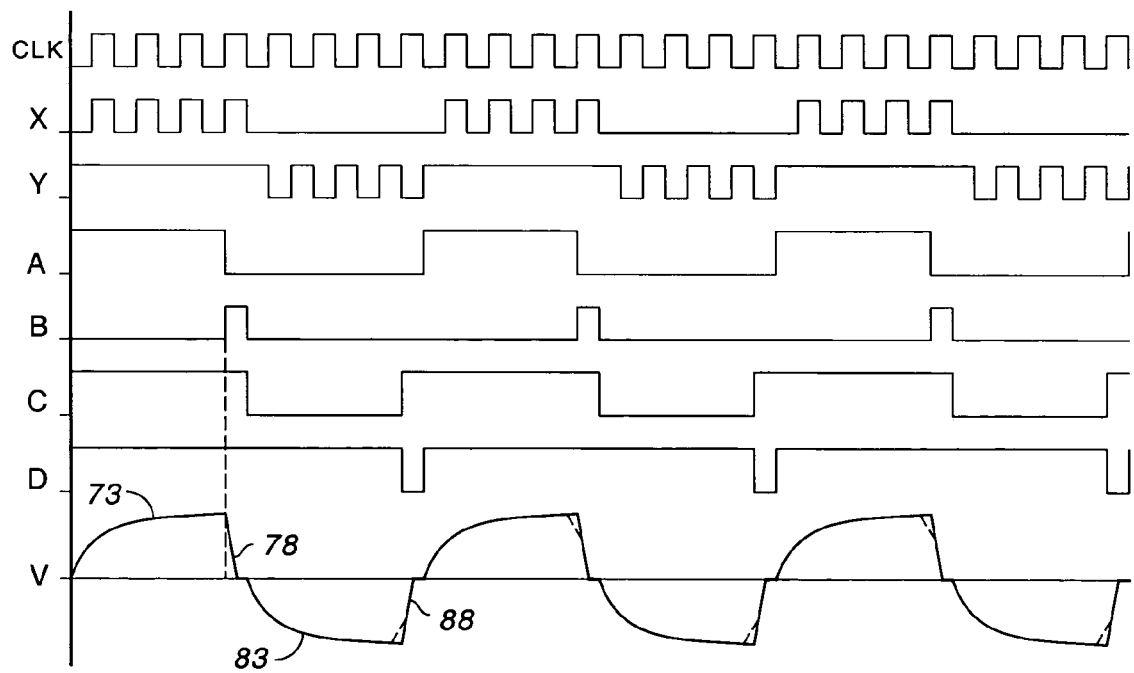
FIG. 6 is a chart of the signals at various points in the circuit illustrated in FIG. 4.

As thus configured, transistor 53, inductor 54, transistor 55, diode 61, and capacitor 62 constitute a negative high voltage supply. Similarly, transistor 53, inductor 54, transistor 55, diode 63, and capacitor 64 constitute a positive high voltage supply. To generate a positive voltage, transistor 53 conducts, as indicated in FIG. 6 by signal "Y", while transistor 55 is pulsed, as indicated by signal "X". The result is a series of positive, high voltage output pulses through diode 63 that charge capacitor 64 positively. To generate a negative voltage, transistor 55 conducts while transistor 53 is pulsed, producing a series of negative, high voltage output pulses through diode 61 that charge capacitor 62 positively. Diodes 61 and 62 are oppositely poled, thereby providing opposite polarity voltages.

The positive voltage on capacitor 64 is coupled to lamp 12 through transistor 71 and resistor 72 during a first interval, represented by curve 73 in FIG. 6. Transistor 71 conducts while signal "A" (FIG. 6) is high. Current spikes are minimized or absorbed by capacitor 64 and resistor 72. Lamp 12 is then discharged through diode 74, transistor 75, and resistor 76 during a second interval, represented by line 78 in FIG. 6. As also indicated by FIG. 6, discharge pulse "B" is high for a period longer than the time required to discharge lamp 12 substantially to common.

In theory, lamp 12 will never discharge to zero volts through a resistor of finite resistance. What is of interest here is the practical, not the theoretical. Lamp 12 is discharged to a sufficiently low voltage that reversing the polarity of the voltage applied to lamp 12 will not cause excessive current. As noted above, the discharge circuit can be referenced to either supply voltage, if there are two, and common or to supply or common. Thus, the residual voltage on lamp 12 can be as much as the absolute magnitude of the supply voltage plus some voltage, e.g. a residual voltage of ±20 volts.

The negative voltage on capacitor 62 is coupled to lamp 12 through transistor 81 and resistor 82 during the next interval, represented by curve 83 in FIG. 6. Transistor 81 conducts while signal "C" (FIG. 6) is low. Current spikes are minimized or absorbed by capacitor 62 and resistor 82. Lamp 12 is then discharged through diode 84, transistor 85, and resistor 86 during the next interval, represented by line 88 in FIG. 6. As also indicated by FIG. 6, discharge pulse "D" is low for a period longer than the time required to discharge lamp 12 substantially to rail 51. As shown by FIG. 6, transistors 71 and 81 conduct alternately to produce an alternating current through lamp 12 and are periodically simultaneously non-conducting twice each cycle of the alternating current, allowing lamp 12 to discharge.

It is known in the art to discharge EL lamps at two different rates for noise reduction; see U.S. Pat. No. 5,789, 870 (Remson). Transistor 91 and 92 provide optional, reduced resistance current paths for increasing the discharge rate after lamp 12 has discharged somewhat. Control signal B' (not shown) begins after pulse B and ends with pulse B. Similarly, control signal D' (not shown) begins after pulse D and ends with pulse D. The result is a gradual discharge, represented by the dashed lines in waveform V, FIG. 6, followed by a more rapid discharge.

The invention thus provides an inverter having a single ended output and reduced current spikes, thereby improving the efficiency of the inverter. The inverter can be implemented in bipolar or CMOS technologies.

Having thus described the invention, it will be apparent to those of skill in the art that various modifications can be made within the scope of the invention. For example, the discharge current paths for a two stage discharge can have the same or different impedances; i.e., the paths do not have to be matched. The reduction in resistance comes from the paths being parallel. Alternatively, one could bypass resistors 76 and 86 with transistors driven by signals B' and D', respectively, to obtain the same effect. Plural transistors can be used where a single transistor is illustrated. That is, for example, two or more transistors can be used in parallel to increase current capacity, or in series to increase voltage capacity, where a single transistor is shown. This is frequently done when implementing a circuit in integrated circuit form. The same technique is often used with passive components also.

What is claimed as the invention is:

1. An inverter for supplying alternating current to an EL lamp, said inverter comprising:
    a first charging path including a first capacitor that is charged to a positive high voltage;
    a first discharging path;
    a second charging path including a second capacitor that is charged to a negative high voltage;
    a second discharging path;
    said paths intersecting at a node, wherein the node is the output of the inverter from which said alternating current can flow.

2. The inverter as set forth in claim 1 wherein said first charging path includes:
    a first transistor coupled between said first capacitor and said node.

3. The inverter as set forth in claim 1 wherein said second charging path includes:
    a second transistor coupled between said second capacitor and said node.

4. The inverter as set forth in claim 1 wherein said first discharging path includes:
    a first reference potential;
    a third transistor coupled between said first reference potential and said node.

5. The inverter as set forth in claim 1 wherein said second discharging path includes:
    a second reference potential;
    a fourth transistor coupled between said second reference potential and said node.

6. The inverter as set forth in claim 5 wherein said first reference potential and said second reference potential are the same.

7. An inverter for supplying alternating current to an EL lamp from a single output terminal, said inverter comprising:
    a supply rail and a common rail;
    a first transistor and a second transistor coupled in series between said supply rail and said common rail;
    an inductor having a first end and a second end, said inductor coupled in series between said first transistor and said second transistor;
    a first capacitor;
    a first diode coupling said first end to said first capacitor;
    a second capacitor;
    a second diode coupling said second end to said second capacitor;
    said first diode and said second diode being oppositely poled;
    a third transistor coupling said first capacitor to said output terminal; and
    a fourth transistor coupling said second capacitor to said output terminal;
    said third transistor and said fourth transistor conducting alternately to provide said alternating current.

8. The inverter as set forth in claim 7 wherein said third transistor and said fourth transistor are periodically non-conducting simultaneously.

9. The inverter as set forth in claim 8 wherein said third transistor and said fourth transistor are periodically simultaneously non-conducting twice each cycle of said alternating current.

* * * * *